UNITED STATES PATENT OFFICE.

MARTIN CONNELLY, OF PHILADELPHIA, PENNSYLVANIA.

PRINTING-INK.

SPECIFICATION forming part of Letters Patent No. 235,670, dated December 21, 1880.

Application filed July 23, 1880. (Specimens.)

*To all whom it may concern:*

Be it known that I, MARTIN CONNELLY, a citizen of the United States, residing at Philadelphia, in the county of Philadelphia and State of Pennsylvania, have invented a certain new and useful Improvement in the Manufacture of Printing-Ink, of which the following is a specification.

This invention relates to a new composition of materials to be used in the manufacture of inks for printers, engravers, &c.

I employ a peculiar product of petroleum as a substitute for the oils (such as linseed-oil, rosin-oil, or cotton-seed oil) ordinarily used in the manufacture of these inks. This product is obtained by boiling, for three hours, crude petroleum and lime together, at a temperature of about 350° Fahrenheit, in the proportion of about eighteen hundred parts of the former to twenty-seven parts of the latter, which results in completely deodorizing the crude petroleum, and in removing, by evaporation and neutralization, all of the materials that are detrimental to ink.

In making my improved ink for printers' use I mix the above-described peculiar product of petroleum with resin, lamp-black, and gum-dammar, in the proportions, by weight, substantially of one part of gum-dammar, three parts of resin, seven parts of deodorized petroleum, and seven parts of lamp-black. In mixing the ingredients I have found it convenient to take at any one time from fourteen hundred (1,400) to eighteen hundred (1,800) pounds of the deodorized product of petroleum, about fourteen hundred (1,400) pounds of lamp-black, three hundred (300) pounds of resin, and one hundred (100) pounds of gum-dammar. Pigments or coloring-matters may be used as occasion requires.

The ink thus obtained I have found to be much superior to those commonly used. It is not affected by climatic conditions, but has a uniform and reliable drying capacity under all circumstances. Moreover, I have found that it can be used with less injury to the rollers and the other devices used by the printers than can inks made of the ordinary ingredients.

I do not confine myself to the exact proportion herein named, for it is necessary to change the proportions of the ingredients for different circumstances, as is well known.

I do not in this application claim the deodorized product of petroleum which I use in the manufacture of the ink, nor the process for obtaining the same, nor the composition thereof with gums or resins, as I shall make these the subject-matters of other applications.

I am aware that in manufacturing printers' ink use has been made of the residuum or heavy products left by distilling petroleum; and I do not claim as my invention compositions containing such residuum products.

What I claim is—

As an improved composition for printers' ink, the herein-described deodorized product of crude petroleum, gum-dammar, resin, and lamp-black, mixed in proportions substantially such as set forth.

MARTIN CONNELLY.

Witnesses:
W. W. DOUGHERTY,
FRANCIS D. PASTORIUS.